(12) United States Patent
Houghtaling et al.

(10) Patent No.: US 11,842,619 B2
(45) Date of Patent: Dec. 12, 2023

(54) SYSTEM AND METHOD FOR INSURING HAND-HYGIENE COMPLIANCE

(71) Applicant: BEMO CORPORATION, Wellington, FL (US)

(72) Inventors: Daren Houghtaling, West Palm Beach, FL (US); Gregory Ruhl, West Palm Beach, FL (US); Christopher Kennedy, West Palm Beach, FL (US)

(73) Assignee: BEMO CORPORATION, Wellington, FL (US)

( * ) Notice: Subject to any disclaimer, the term of this patent is extended or adjusted under 35 U.S.C. 154(b) by 0 days.

(21) Appl. No.: 17/353,990

(22) Filed: Jun. 22, 2021

(65) Prior Publication Data

US 2021/0407278 A1    Dec. 30, 2021

Related U.S. Application Data

(60) Provisional application No. 63/043,320, filed on Jun. 24, 2020.

(51) Int. Cl.
| | | |
|---|---|---|
| *G08B 21/24* | (2006.01) | |
| *G06F 1/16* | (2006.01) | |
| *G08B 25/10* | (2006.01) | |
| *G08B 7/06* | (2006.01) | |

(52) U.S. Cl.
CPC ........... *G08B 21/245* (2013.01); *G06F 1/163* (2013.01); *G08B 7/06* (2013.01); *G08B 25/10* (2013.01)

(58) Field of Classification Search
CPC ........ G08B 21/245; G08B 7/06; G08B 25/10; G06F 1/163; G06F 3/016
See application file for complete search history.

(56) References Cited

U.S. PATENT DOCUMENTS

| | | | |
|---|---|---|---|
| 2010/0117836 A1* | 5/2010 | Seyed Momen | G16H 40/20 340/573.1 |
| 2016/0275778 A1* | 9/2016 | Wallace | G16Z 99/00 |
| 2018/0288280 A1* | 10/2018 | Bermundo | H04N 1/4446 |
| 2018/0293873 A1* | 10/2018 | Liu | G08B 21/245 |
| 2020/0005623 A1 | 1/2020 | Liu et al. | |
| 2020/0074836 A1 | 3/2020 | Kolavennu et al. | |
| 2021/0166551 A1* | 6/2021 | Cross | G08B 21/245 |
| 2021/0295673 A1* | 9/2021 | Liu | G16H 40/20 |

* cited by examiner

*Primary Examiner* — An T Nguyen
(74) *Attorney, Agent, or Firm* — INNOVATION CAPITAL LAW GROUP, LLP; Vic Lin

(57) ABSTRACT

The present invention relates to hardware, systems and software methods to insure compliance of personnel in jobs where sanitized hands are dependent on washing according to time intervals. The system includes a hand-hygiene station, a sanitizing dispensing device, a computer and a communication channel. A wearable vibration and visual alert device communicates, illuminates and vibrates dependent on timing between hand washing utilizing sensors positioned both adjacent to a hand washing station and installed in un-sanitized areas. Each of the plurality of sensors may be configured to provide a corresponding sensor output signal that is indicative of whether a person has washed their hands at a hand washing station.

19 Claims, 4 Drawing Sheets

SYSTEM AND METHOD FOR INSURING HAND-HYGIENE COMPLIANCE

CROSS-REFERENCE TO RELATED APPLICATIONS

This nonprovisional patent application claims the priority benefit under 35 U.S.C. 120 for U.S. provisional patent application Ser. No. 63/043,320, filed on Jun. 24, 2020, the entire disclosure of which is hereby incorporated by reference.

FIELD OF INVENTION

The present invention relates to devices, software systems, and methods for insuring hand-hygiene compliance to reduce the risk of spreading virus and bacterial infection.

BACKGROUND

Almost 1 in 10 individuals worldwide become ill and 420,000 die from consuming contaminated food or water each year. In the U.S. alone, 48 million people get sick, 128,000 are hospitalized, and 3,000 lose their lives to foodborne illnesses. Not to mention person to person contagions. There are 31 notable foodborne bacteria, viruses, parasites, toxins, and chemicals that cause food and water contamination globally. The following pathogens often cause foodborne illnesses; *Campylobacter, Clostridiums, Cyclospora cayetanensis, E. coli, Listeria, Monocytogenes, Norovirus, Salmonella, Staphylococcus aureus*, and SARS-CoV-2 virus (COVID-19).

Due to COVID-19, the US economy has lost trillions of dollars and more than 50 million jobs. To recover economically and without harm businesses large and small have to refocus on their Prime Directive, the reacquisition of customers and their customer's safety. More than ever people want to feel safe. As a business owner its not going to be enough to tell customers how much you care about their safety. Retail food establishments must comply with the Food and Drug Administration (FDA) 2017 Food Code in TFER for minimum food safety rules. State health services are requiring Certified Food Manager Programs, to accredit food manager training programs that specifically include the frequency of a food handler's hand washing regime. In fact food manager training and certification has become a standard of the food industry as well as a regulatory standard throughout the United States, many including that handwashing be performed at timing intervals dependent on various customer servicing factors. Thus food establishment owners to have a hedge against liability exposure they need to demonstrate an effective, no-nonsense tangible mitigation, that is both certified and records proof of compliance.

Liu, et al, US Pub., 20200005623, discloses a system and method for detecting hand hygiene compliance, where a healthcare provider may wear an electronically controlled wristband. This system interacts with a stationary controller that is integrated with or proximate to a hand cleaning agent dispenser. Specifically, its stationary controller may determine whether hand cleaning agent (such as sanitizer, soap, or the like) has been dispensed, and the wristband may determine whether the hand movements were sufficient, e.g., the hand movements were for at least a predetermined amount of time. However Liu, et al, do not use time as and indication or a requirement that washing had become mandatory. In the food handling industry, time is a large factor in considering the Poisson distribution nature of manner of the increase of probability that a food handler will become contaminated the longer the interval between washings. Thus, time, as a parameter that determines the interval of time a food handler should be viewed as a necessity if food borne illnesses are to be minimized.

Kolavennu, et al US Pub., 20200074836, discloses methods and systems for stationing procedural compliance of staff in a food handling facility. The system may include a plurality of sensors positioned adjacent a hand washing station. Each of the plurality of sensors may be configured to provide a corresponding sensor output signal that is indicative of whether a person is washing their hands at the hand washing station or not; dwelling at the hand washing station for a predetermined length of time; and departing from the hand washing station. However as in Liu, et al, Kolavennu, et al also do not use time as a parameter that determines the length of time a food handler has been active in handling food before its necessary and vital to wash their hands. It fails to monitor the act of washing hands as a reset of the time interval before another handwashing is required.

What is needed is a device, system and method that stations time as a parameter where the system and method determines the length of time a food handler has been active in handling food before its necessary to wash their hands. This is vital to remain compliant with the local institutional policies, as well as local, state and federal rules on handwashing compliance. Verification and certification of handwashing intervals will add to reducing food born contagions, increase consumer confidence, help reduce insurance premiums, insure compliance with policy and law and reduce lawsuits.

SUMMARY OF THE INVENTION

The invention addresses the above according to the following objects: (1) it offers a dynamic real time visual and haptic alert of hand sanitization compliance for a user based on time intervals, (2) it results in the behavior modification of the user, (3) provides compliance with sanitary policies and procedures, and (4) notifies compliance for the management of its sanitization policy and protocols. The forgoing alert portion of the invention provides a feature, embodied in a wristband, cuff, badge, hat, necklace, or button. Each of these embodiments are accessible to management via computer display devices (e.g., desk top lap tops, smart phones), as well as other forms of real time signaling to the wearer of the device, as well as a casual observer or other interested persons, such as a customer or coworker.

The system incorporates user defined tasks and roles, timing of handwashing protocols, and events that require handwashing relative to a worker's tasks and roles. Both active and passive triggers alert the food handler and its management of the status of procedural hygiene compliance and identification of users, including, but are not limited to using: lights, audible sounds, vibrations and other haptic sequential stimuli to create a kinesthetic communication or 3D touch, to create an experience of touch by applying forces, vibrations, or motions to the user as may be useful in practice or training.

The system and methods disclosed herein apply to high risk sanitizing service zones. In total the systems and methods employed improve sanitization in the hospitality, food handling/processing, retail industries, hospitals, emergency rooms, science and technology laboratories, child care centers, schools, maid services, and other occupations that require high levels of cleanliness, to insure health, welfare of workers, customers, patients and students, to insure consumer confidence, as well as improving the quality of sanitary conditions or product and services, while reducing potential legal liability.

In one embodiment, a hand-hygiene-monitor includes: a wearable vibration and visual alert beacon configured for attachment to a user, which communicates with a computer, the computer programmed to station an interval of time, i.e., a time between a start time and a stop time, wherein the start time is determined by a user event, such as handwashing and/or the initiation of a transmission by an associated cleanser dispenser, and the stop time determined by a computer programmed according with a prescribed interval period.

In another embodiment a system for stationing hand-hygiene includes: one or more sensors positioned at a hand washing station, each of the sensors configured to provide a corresponding sensor output signal when a person is within the proximity of the washing station or un-sanitized areas or apparatuses. When a user is in the proximity of a sanitizing station, a signal indicative of when the person arrives and departs the station, wherein each of said arrival or departure results in a colored display of an indicator; and wherein the person's departure from the handwashing station optionally transmits (1) a first signal to (a) a computer, wherein the computer resets a first color on the wearable vibration and visual alert beacon indicator or (b) a first alternative signal to the hand-hygiene-monitor to reset a first color on the hand-hygiene-monitor 160 indicator, and (2) a first alternative signal to the computer, which sets an interval clock that runs, until a fixed time has elapsed, before transmitting a second signal to the hand-hygiene-monitor, which sets the hand-hygiene-monitor indicator to a second color.

In another embodiment, the hand-hygiene-monitor includes a display referred to as a "Green Mode" for a limited amount of time, after which "Vibration Mode" initiates a reminder to the wearer to wash and sanitize their hands at a washing station.

In yet another embodiment when the a wearable vibration and visual alert beacon is activated by an RFID transmitting device or receives an infrared signal, by way of example and not limitation, the hand-hygiene-monitor will initiate a signal to an automatic detergent dispensing device to allow a sanitizer to flow. Upon maintaining proximity to the washing station for an interval of time the hand-hygiene-monitor indicator resets to Green Mode.

DETAILED DESCRIPTION OF THE INVENTION

In the figures to be discussed the blocks and arrows represent functions of the process according to embodiments of the present invention which may be implemented as processors, computers, computer executable code, and/or electrical circuits and associated wires or data buses, which transport electrical signals. Alternatively, one or more associated arrows may represent communication (e.g., data flow) between software routines, particularly when the present method or apparatus of the present invention is implemented as a digital process.

Figure 1:
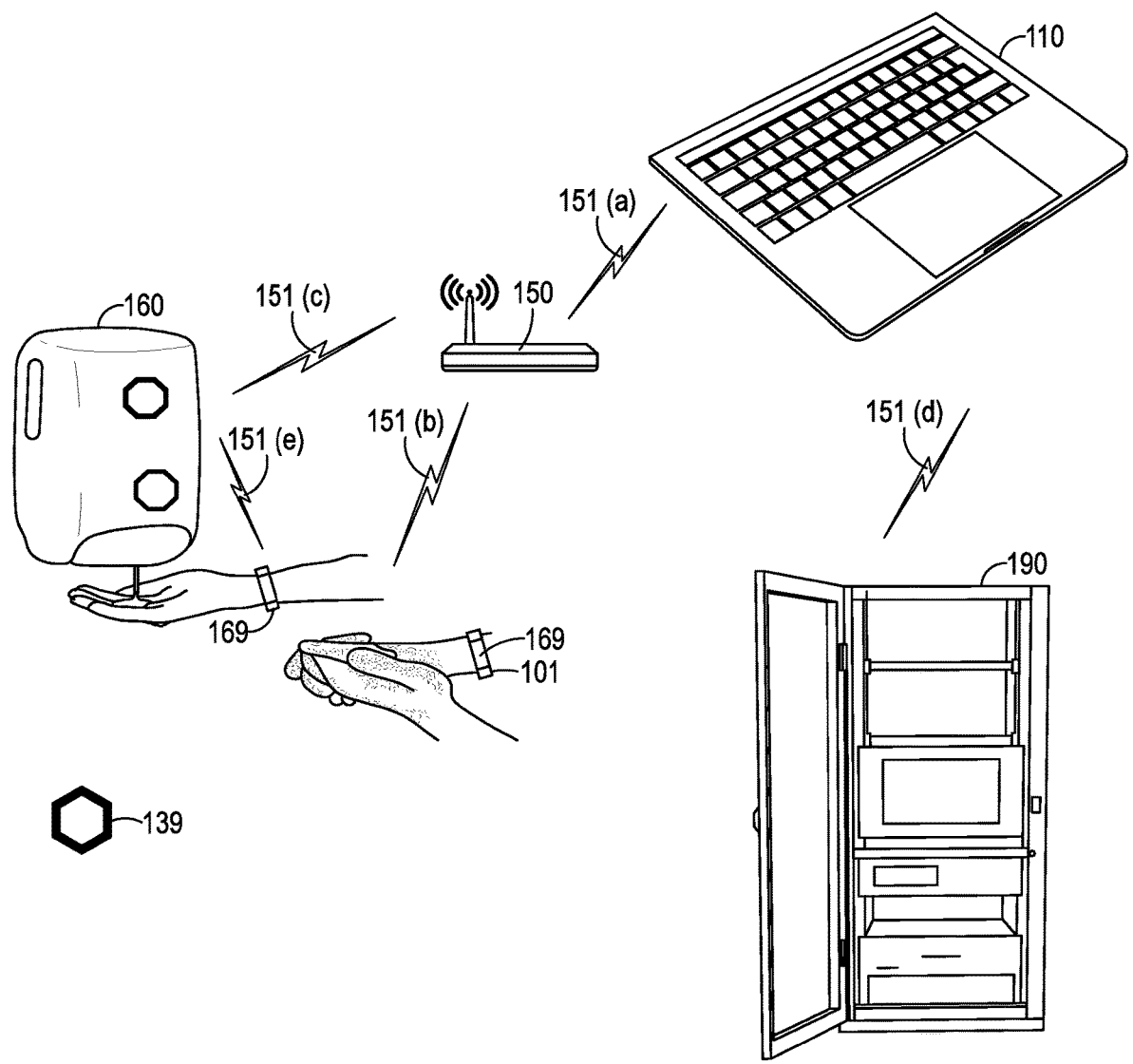
FIG. 1 is a computer system for maintaining a sanitized facility in accordance with an embodiment of the present invention.
Figure 2:
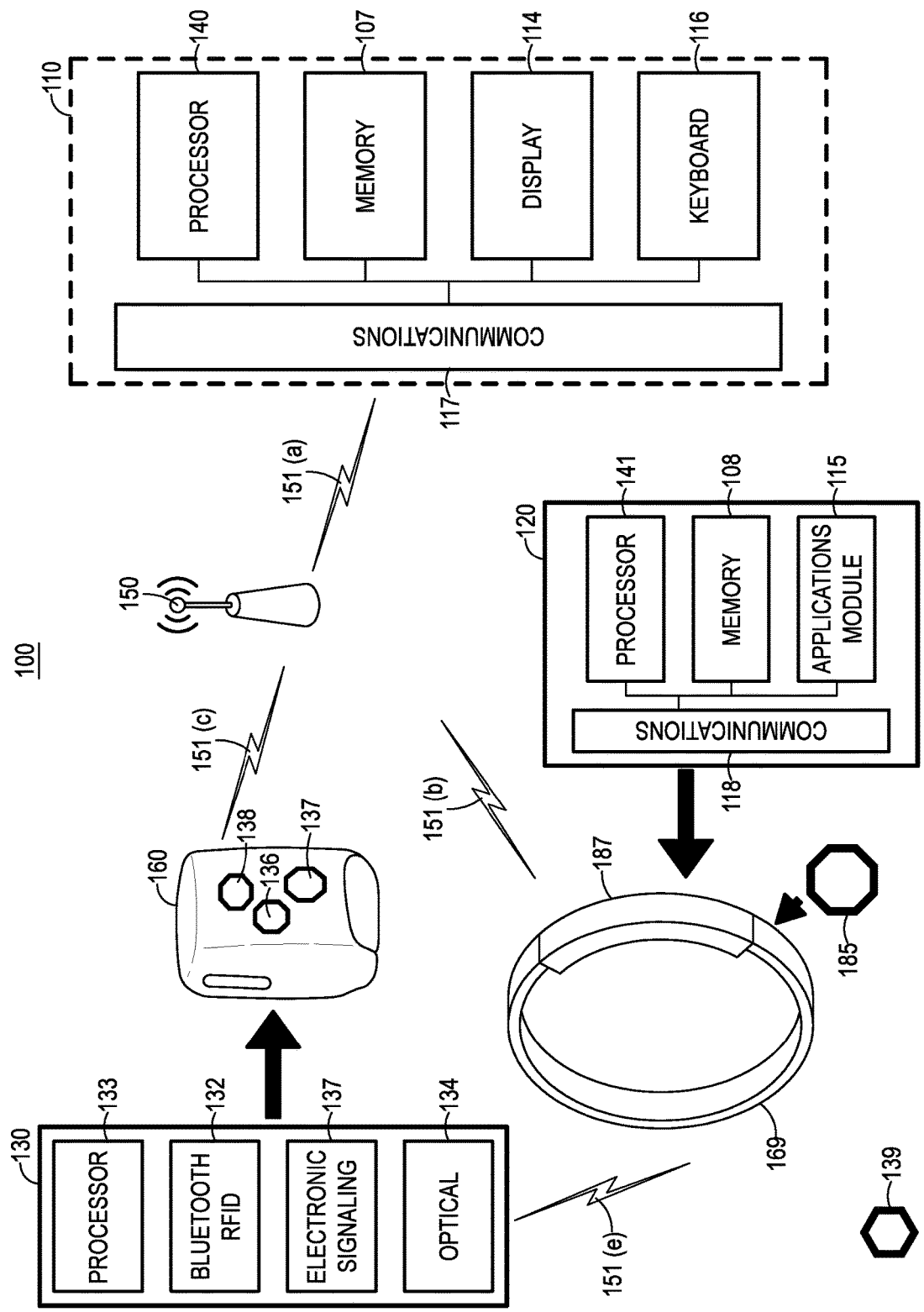
FIG. 2 is a computer system for maintaining a sanitized facility in accordance with an embodiment of the present invention.

As shown in FIG. 1 and FIG. 2, system 100 is accessible to a plurality of users whose hygiene is time dependent due to their specialized work related activities, such as managers of hospitality, food handling/processing, retail industries, hospitals, emergency rooms, science and technology laboratories, child care centers, schools, maid services, and other occupations each equipped with a browser, that may include an application specific dashboard to display and control the various modes of operation as disclosed herein.

FIG. 1 and FIG. 2 illustrate system 100 in accordance with an embodiment of the present invention for stationing hand-hygiene including: a wireless wrist band 169 having one or more of a visual, audible or vibratory indicator, in communication 151 (b) with a computer processor 110 and a washing station 162. The monitor 160 includes therein a first sensor 136 output signal activated when, dependent on the expiration of a timed interval, an individual wearing the wristband 169 enters a zone proximal to the monitor 160. The entry activates a second sensor 137 output signal when the individual engages in a sanitation activity, such as washing their hands. A third sensor 138 output signal is activated when the individual departs the zone, the second sensor 137 and the third sensor 138 output remain in communication with a processor that logs data indicative that a hand-hygiene protocol has been achieved. The processor thereupon communicates with the wristband to effectuate one or more conditions: a) changing a color on the wristband visual indicator, b) changing a previous state of the wristband vibrator, and optionally c) changing a color, or d) the status of an audibly emitting a tone from one or more of the wristband, monitor, or transducer and indicators situated in other locations.

The monitor 160 may also include further an electronic clock to determine the expiration of a lapsed period of time during hand washing dependent on the worker-role of the wearer of the wristband.

The system 100 further including a timer which is programmed in computer 110, the expiration of which is dependent on the third sensor output signal being sent to the computer processor 110 specifying when the individual must return to the monitor for a subsequent sanitation process.

The system 100 includes a local-area-network (LAN) 150 and Internet communication facility. Communications link 151(a) connects computer 110 through a local network 150, which (a) communicates 151(b) with the hand-hygiene-monitor 160, attached to a user 101 and (b) which communicates 151(c) with a washing station 162 having a sanitizing dispenser.

As shown in a preferred embodiment, FIG. 1 and FIG. 2, the system 100 includes and a cloud based network via the communication link 151 (d) to a remote server 190. The LAN 150 and the Internet allow system-wide communication between the local computer 110 (which includes keyboards, inputs from remote sensing devices, and communications facilities) and output devices (which include printers, disk drives, communication facilities), each configured by software (processor executable code), hardware, firmware, and/or combinations thereof, for accumulating, processing, administering and analyzing data, records and other information pertinent to the objects of the present invention.

"Computer," such as reference 110, refers to a computing device that includes a processor 133, 140, 141, which contain an arithmetic logic unit (ALU), which perform arithmetic and logical operations, and a control unit, which extracts instructions (e.g., software, programs or code) from memory and decodes and executes them, calling on the ALU when necessary.

A "Memory," referenced as 107, 108 herein, refers to one or more devices capable of storing data. Memory 107, 108 may take the form of one or more media drives, random-access memory (RAM), read-only memory (ROM), programmable read-only memory (PROM), erasable programmable read-only memory (EPROM), or electrically erasable programmable read-only memory (EEPROM) chips, by way of further non-limiting example only. Memory may be internal or external to an integrated unit including a processor or a computer. The computer may include a display, 114, 115, a keyboard, 116, and a communications module, 117, 118.

The term "server," as used herein, generally refers to a computer or device communicatively coupled to a network that manages network resources. For example, a file server 190 is a computer and storage device dedicated to storing files, while a database server is a computer system that processes database queries. A server may refer to a discrete computing device, or may refer to the program that is managing resources rather than an entire computer.

In FIG. 1 and FIG. 2, other hardware configurations may be used in place of, or in combination with non-transitory computer-readable mediums for execution by a processor, for example software code to implement an embodiment of the invention. The elements illustrated herein may also be implemented as discrete hardware elements. As would be appreciated, the inventive system described herein terminals for inputting data or may be a hardware configurations, such as a dedicated logic circuits, integrated circuits, Programmable Array Logic (PAL), Application Specific Integrated Circuit (ASIC), that provides known outputs in response to known inputs.

The sub-module 130, discloses one embodiment of a washing station that incorporates hand-hygiene monitor 160, which includes various functionality controlled via processor 133. In one non limiting mode the processor 133 communicates with sensors 136, 137, 138 (referred to as first, second and third sensor, respectively) located in the hand-hygiene-monitor 160. Electronic sensor signaling 137 also communicates with the LAN 150 via communications link 150 (c) in response to computer 110 communications.

Communication link 151(e) represents one or more types of communication, between the dispenser function of the hand-hygiene-monitor 160, the data dependent on proximity sensors (see FIG. 2, 136, 137, 138, which may be transmitted in various electronic forms, as for example RF, RFID and generally devices that utilize capacitance or inductive fields, or optical, as for example infrared, respectively.

There are one or more modes of communication to and from the hand-hygiene-monitor 160 having a wearable vibration and visual alert beacon, such as RF transmission, blue tooth technology, RFID or infrared. In each case both the hand-hygiene-monitor 160 and its dispenser function utilize specific technology to effectuate communications when the wearer of the wristband 169 come within an approximate distance of the monitor. In the case of blue tooth, sub-module 132 communicates with a corresponding blue tooth device (not shown) embedded in the hand-hygiene-monitor 160, serviced by communication module 118. Likewise an optional infrared receiver/transmitter 134 would communicate with a receiver/transmitter sub-module embedded in the hand-hygiene-monitor 160. In similar fashion and functionality, an RFID receiver/transmitter within one non limiting embodiment communicates with a receiver/transmitter sub-module embedded in the hand-hygiene-monitor 160 via communications 118.

When an interval of time, as established by a computer 110, has been reached, an RF signal is received by the hand-hygiene-monitor 160, which causes the applications module 115 in module 120 to actuate a vibrator 185. A light in the hand-hygiene-monitor 160, such as an LED array 187 will have been or will illuminate, such as in the color red. Upon completion of a hand washing, the vibrator 185 will cease to vibrate and the color of the light will change, such as to the color green.

Figure 3:
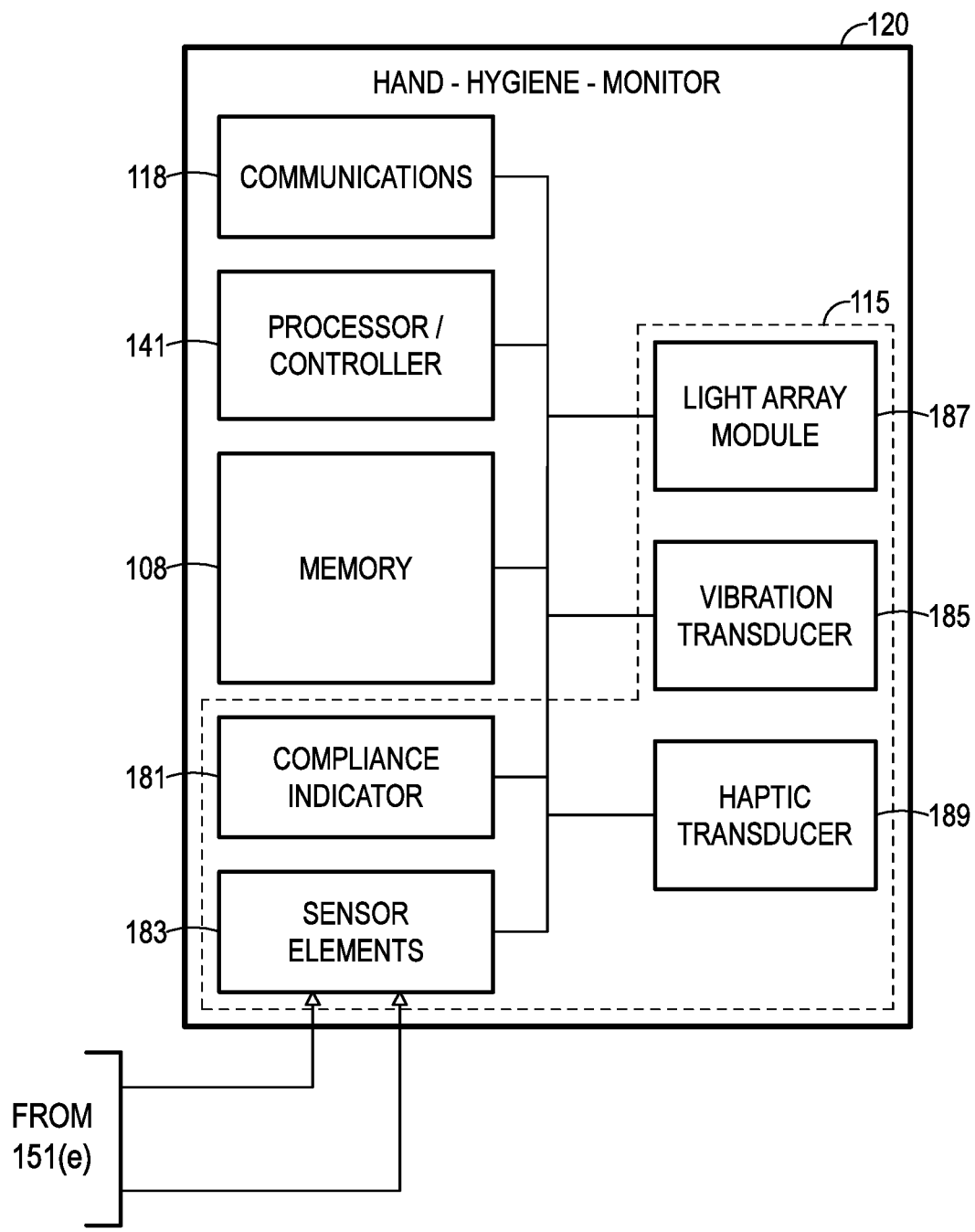
FIG. 3 is a hand-hygiene-monitor 160 wearable vibration and visual alert beacon in accordance with an embodiment of the present invention.
Figure 4:
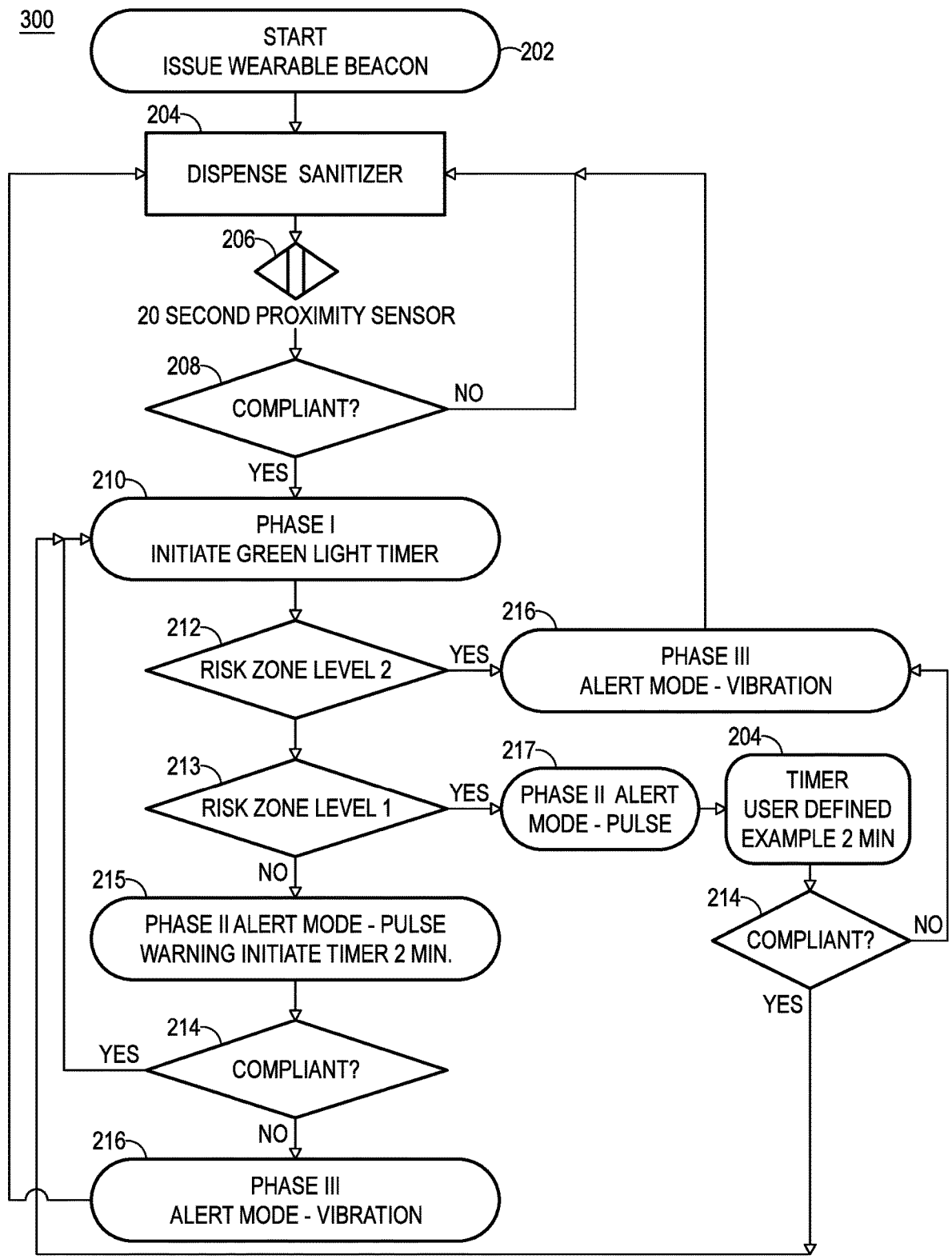
FIG. 4 is a flow chart illustrating the sequencing of events for maintaining a sanitized facility in accordance with an embodiment of the present invention.

In one embodiment, system 100 and process 300 (FIG. 4) communicate with LAN system 150 configured with software to carry out the functions as detailed in FIGS. 1, 2, 3, and the process detailed in FIG. 4.

FIG. 3 further discloses one non-limiting embodiment of the electronic components incorporated in the functional module 120 that are used to effectuate the process 300 for insuring the operation of the wearable vibration and visual alert beacon 160. A sensor element receiver is enabled via the communications 118 or independently as in the case of the RFID receiver or the infrared optical receiver. RF communications to and from the computer and the hand hygiene-monitor 160 may be received by the communications module 118. The module 120, also includes processor 141, a memory 108, programmed to control a compliance module that determines the state of the light array module 187, the vibration transducer 185 and an optional haptic transducer 189.

The process for insuring hand-hygiene compliance is initiated by computer 110 in the execution of various programs using proprietary or non-proprietary software and network protocols, and over other public and/or private computer networks. Furthermore, although preferred embodiments include human-machine interface displays and applets that are capable of running in standard browsers, the invention may be practiced using native human machine interface applications that run directly under the host computers' operating systems (e.g., MICROSOFT® WINDOWS® operating system, Windows NT, UNIX® operating system, macOS Apple™ operating system, LINUX® operating system, iPhones, Androids, and the like).

In one embodiment, the system FIG. 2 and an associated process 300 is shown in FIG. 4, which includes: the wearable vibration and monitor 160 configured for physical and electronic connection to a user 101, which communicates with computer 110, the computer programmed to set an interval of time, i.e., a time between a start time and a stop time, wherein the start time is determined by a user event, such as the most recent handwashing and/or the initiation of a transmission by the hand hygiene module 160, and the stop time defined by a computer programmed according to a prescribed interval period and activity of the user.

In another embodiment the system FIG. 2, and a process 300 as shown in FIG. 4, includes: signaling by one or more proximity sensors 136, 137, 138 positioned at the hand hygiene-monitor 160, wherein the sensors are configured to provide corresponding sensor output signals when a person is within the proximity of the hand hygiene-monitor 160. The signals are indicative of the person arriving and departing the hand hygiene-monitor 160, wherein each of said arrival or departure times causes the hand-hygiene-monitor 160 indicator to change colors; and wherein the person's departure from the hand hygiene-monitor 160 optionally results in transmitting (1) a signal to (a) a computer, wherein the computer resets a first color on the wristband 169 light array module 187 or (b) a first alternative signaling directly to the hand-hygiene-monitor 160 light array module 187 resetting a first color on the wristband 169; and (2) a first alternative signaling to the computer, resulting in setting an interval clock that runs, until a fixed time has elapsed, before transmitting a second signal to the wristband 169, resulting in setting the state of the wearable vibration and visual alert light array module 187 to a second color.

In another embodiment, the system including wearable vibration and monitor 160 also includes the wearable display ini wristband 169, wherein the light array module 187 remains in a state referred to as a "Green Mode" for a limited amount of time, after which a second state, referred to as a "Vibration Mode," initiates a reminder to the user to wash and sanitize their hands at a washing station that includes the dispenser part of the hand hygiene-monitor 160.

In another embodiment, after remaining at the hand hygiene-monitor 160 dispenser for at least a specified amount of time, determined by a management policy programmed into to computer 110 program, a timer is reset for a subsequent specified period of time, before necessitating the utilization of the hand-hygiene-monitor 160 to notify the user of the requirement for washing its hands.

In another embodiment, if the hand-hygiene-monitor 160 light array module 187 is not reset successfully after a length of time, the light array module 187 state will change from a "Green Mode" to "Red Mode."

In yet another embodiment when the hand-hygiene-monitor 160 is activated by an RFID transmitting device or receives an infrared signal, by way of example and not limitation, then the hand-hygiene-monitor 160 will initiate a signal to an automatic detergent dispensing device to allow a sanitizer to flow. Upon maintaining proximity to the washing station for an interval of time the hand-hygiene-monitor 160 light array module 187 resets to Green Mode.

Each installation of the system 100 will allow management of a business to determine specific rules and permissions for each defined roles, responsibilities and authorizations within an organization. Representative settings would include washing intervals, lessened or heightened risk zones and active zones, as well as entry into and exit of active zones.

In another embodiment two primary types of installations are referred to as Type 1 and Type 2: the former designating users who would not be anticipated to contact food and the latter users having contact with food as a primary function. By way of example, a Front of House Type 1 may be at a retail location or at a check in/check out desk at a hotel. Management could further have defined rules as managers, clerks and custodial workers. Food & Beverage Type 2 may exist at a restaurant, hotel or cruise ship. Varying defined roles could include food handlers, servers, bartenders, bussers/food-runners hostesses and dishwashers.

As shown in FIG. 4, a Phase 1 Green Mode 210 would be adjustable for each role. For example, a check-in clerk in a hotel or cashier in a retail organization may be assigned to wash their hands every 30 minutes for 20 seconds. Whereas a food server in a restaurant may be required to wash their hands every 20 minutes for 20 seconds. While the hand-hygiene-monitor 160 is in Mode 210, it would indicate or emit a green light visible to the wearer and anyone within an approximate distance, such as 25 feet.

A Phase 2 Alert Mode+Pulse 217 may be optionally adjustable for each role and this would be the mode, within which the hand-hygiene-monitor 160 would display the green light plus emit a vibration to alert the wearer that they have entered into a predefined countdown mode. By way of example and not limitation, a wearer may have 2 minutes to wash hands and upon a successful hand washing sequence as determined by the system, the hand-hygiene-monitor 160 returns to Phase 1 Green Mode 210.

A Phase 3 RED Mode+Vibrate 216, may optionally be utilized where the hand-hygiene-monitor 160 displays a red light and the vibrator 185 vibrates constantly notifying user that they must proceed directly to a hand washing station before contact with any surfaces or other individuals. Upon a successful hand washing sequence the hand-hygiene-monitor 160 light array module 187 and vibrator 185 would return to the Phase 1 Green Mode 210.

In most applications there would be at least two risk zones a Level I 213 and Level II 212. By way of example, and not limitation, an interior garbage receptacle or food storage area or Level II 212 risk zone, exit/entry to premises, a lavatory or laboratory, each having a proximity sensor 139 (see, FIG. 2). By way of another example, if a wearer of the inventive device exited a restaurant, either front entry or rear, and accessed a dumpster, then as soon as they re-entered the premises, there would be an automatic activation of Mode 216

In a further overview, the process 300 is carried out via a program, which includes code for establishing risk zones defined by remote proximity sensors installed in the zones. By way of example, and not limitation, the process and associated code initiates queries if the wearer of a wristband 169 is in a level 1 zone, and if the wearer is in a level 1 zone then a more fully described below, initiating a phase II alert mode that allows the processor to send a vibration pulse. In yet another non limiting example, the process 300 and associated code determines the passage of an interval of time\, whereupon the processor initiates a query communicated to a hand sanitation compliance module, and if the compliance is returned as negative, then the wearer of the wristband 169 is notified as to its entry into a Phase III alert mode by the vibration of a vibrator embedded in the wristband.

To expand on the foregoing, the system and associated process establishes such risk zones, such as by way of example, the Level I 213 risk zones where remote proximity sensors 139 (FIG. 1) are installed in the zones. At decision point 213 the process 300 queries if the user 101 is in a level 1 zone, and if they are then, a phase II alert mode with vibration pulse 217 is initiated. After an interval of time determined by a set time 219, a query is made as to hand sanitation compliance 214. If the compliance is negative or NO, then the user 101 enters the Phase III alert mode with vibration 216. I the user 101 is compliant at 214, then the user 191 reverts to the state at 210.

These proximity sensors upon contact with the hand-hygiene-monitor 160, would communicate directly with the computer 110 or via the hand-hygiene-monitor 160. The communication triggers the hand-hygiene-monitor 160 to initiate a Phase 2 Alert Mode+Pulse 217. By way of example and not limitation, a Level I 213 risk zone could be a sanitation area within a building. Dropping something in a garbage can would not activate P2AM+P 217, but moving the garbage can away from a sensor would activate the Mode 217, but still allow the user ample time to exit the building or to a reach a sanitization station, such as dispenser 162 without triggering the Mode 216.

In another embodiment Level II 212 risk zones, would represent Fail Safe Zones where the proximity sensors 139 automatically trigger the Mode 216 state forcing a wristband 169 wearer to proceed directly to a hand-hygiene-monitor 160; and upon completion of a successful hand washing sequence, the hand-hygiene-monitor 160 would receive a signal to return to Phase 1 Green Mode 210.

A Visual AZ is defined as any area that after a validated completion of a handwashing event, a Visual Confirmation or feedback response would be initiated. By way of example and not limitation, any location, such as a guest at dining room table, when a customer may depart the table. The table and associated seating area would be (1) cleaned, (2) with a sanitizer and (3) by the user 101. When the sanitization process completes (1,2,3), the hand-hygiene monitor 160 would send a signal to the computer 110 to send a signal to illuminate the under-lighting at the table. The lighting would visually indicate to observers, such as a hostess and approaching customers that that the table and area have been sanitized. The process optionally would synchronize the user 101 wristband 169 and hand-hygiene-monitor 160 associated with the particular table, and/or send an indication to the computer 110 or remote server 190 that the table is ready for seating of guests. Other such applications may include analogous maid services in cleaning hotel rooms, bathrooms, maintenance of hospital facilities, surgical centers, and laboratories.

In one embodiment a Non-Visual mode is defined as any area or section that only indicates status to a computer 110 programmed dashboard, and not a visual indicator at a particular table, area or section. By way of example and not limitation, a bar with seating for 20 customers, includes a section timer and/or one or more motion sensors visible on a computer programmed dashboard visible to a bartender, bar-back, busser, hostess or manager. A Green (Sanitization Event Completed within Time Parameter), Yellow (Guest Seated) and Red (Time Parameter Exceeded) Dashboard could alert, approved users 101 triggering a required job function with hand-hygiene-monitor 160 message "Sanitize Section 6 of Main Bar."

In another embodiment a Permission Based Zone includes, by way of example, a dishwashing station where only a busser or steward is authorized to enter the sanitized side of a dishwashing station, if a user is in Phase 1 Green Mode 210, if a Non Approved User/Role/Phase triggers Permission Based Violation, a user Immediately enters Mode 216, Dashboard is alerted, the incident is tracked, management is alerted with a message for example, "Dishwash Area Sanitization Chain Violated," as by way of example, "John Smith Not Approved."

Again, referring to FIG. 4, the process 300 is performed by the system described in FIG. 2, wherein the operation of the sequencing of events may be distributed among the computer 110, the hand-hygiene-monitor 160 processors 133, 140 and 141 respectively. Note as previously described, sub-module 130 discloses one non limiting embodiment of the invention, which includes various functionality controlled via processor 133. The process 300 starts at step 202, by dispensing a sanitizer, step 204, in the presence of a user 101 (FIG. 1) wearing wristband 169.

Until the passage of a fixed period of time, compliance step 208 is unsatisfied and the loop 202, 204, 206 208, 212, 216 operates continuously.

Following compliance, for a fixed interval of time by way of example the user 101 enters Phase 1—Green Mode 210. The amount of time is predetermined by a User Defined Parameter set by management policy.

If Level 1 213 Risk Zone, indicates Yes, then the user enters Phase 2—Alert Mode+Pulse 217. If "Yes," then the user enters Phase 2—Alert Mode+Pulse Mode 217. The user 101 must then initiate a hand washing sanitization sequence within the User Defined Parameter. Upon compliance, based on a preset time 219 or automatically, the user 101 returns to P1GM. If at Level 1 the indication is NO, then the user enters Phase 2—Alert Mode+Pulse, step 215. If User initiates handwashing within User Defined Parameter preset time it returns to Mode 210. If User does not initiates handwashing within User Defined Parameter, determined at decision point 214, then the user 101 reverts Phase 3—Red Mode+Vibrate, step 216. User must then initiate handwashing immediately to return to Phase 1 Mode 210.

If user does not trigger any Risk Zones, the user enters Phase 2 for a predetermined User Defined Parameter and prior to expiration of that User Defined Parameter. Upon a visual alert the user must initiate hand washing or the system automatically enters Phase 3—Red Mode+Pulse step 216. If user initiates handwashing within User Defined Parameter, a preset visual alert returns to Mode 210.

Still another feature of the invention allows for conventional modes of computer 110 communications such as by way of example: traditional email, texting and in program chat. Traditional email allows for the user (or staff member) to communicate with an individual outside of the program such as other managers or corporate management. This feature allows for the attachment of certain records from the repository, as regards compliance. An example may be to send a specific record for further discussion, or to schedule training.

In still another embodiment, the invention contains a 'task' management feature, which serves multiple purposes. Tasks may be manually entered, and this allows managers access to a dashboard of sanitizing related activities and tasks displayed by the visual presentation.

While the foregoing invention has been described with reference to the above embodiments, additional modifications and changes can be made without departing from the spirit of the invention.

We claim:

1. A system for hand-hygiene comprises:
a wireless wristband having one or more of a visual, audible or vibratory indicator, in communication with a processor and a hand hygiene monitor, the monitor having therein a first sensor output signal activated when an individual wearing the wristband enters an entered zone of a plurality of zones, the entered zone proximal to the monitor; and a second sensor output signal activated when the individual engages in a sanitation activity, and a third sensor output signal when the individual departs the entered zone, the second sensor and the third sensor output in communication with the processor that logs data indicative that a hand-hygiene protocol has been achieved, and whereupon the processor communicates with the wristband to effectuate one or more conditions: a) changing a color on the wristband visual indicator, b) changing a previous state of the wristband vibrator, and optionally c) changing the color on the wristband visual indicator, or d) emitting a tone from one or more of the wristband, monitor, or an audible or a vibratory transducer situated in other locations, wherein:

the plurality of zones are each assigned to one of multiple risk zones, the multiple risk zones each associated with a risk level associated with a respective zone;
an alert is activated upon an expiration of a timed interval or upon entry of the wristband into a predefined zone of the plurality of zones;
a type of the alert is assigned based on the risk level associated with the predefined zone; and
the one or more conditions are dependent the risk level associated with entered zone.

2. The system in claim 1 further including a timer, wherein the timer counts down a timed interval, the timed interval based on a predetermined time from when the individual engaged in a previous sanitation activity to signal when the individual must return to the monitor for a subsequent sanitation process.

3. A process for controlling an operation of a wearable wristband having therein a vibrator and visual alert comprises:
enabling a wearable transceiver of the wearable wristband to establish an electronic or optical communication between one or more sensors of the wearable wristband and a computer;
activating an alert, the alert being at least one of the vibrator and the visual alert, upon an expiration of a timed interval or upon entry of the wearable wristband into a predefined zone of a plurality of defined zones;
assigning each of the plurality of defined zones to one of multiple risk zones, the multiple risk zones each associated with a risk level associated with a respective zone;
assigning a type of the alert based on the risk level associated with the predefined zone;
dependent on a proximity of a wearer of the wristband to a hand hygiene monitor, automatically dispensing a sanitizing agent to the wearer of the wristband;
deactivating the state of at least one of the vibrator and the visual alert; and
resetting the timed interval after the wearer is detected being proximate to the hand hygiene monitor.

4. The process in claim 3 wherein the timed interval is dependent on a worker-role of the wearer of the wristband.

5. The process in claim 3 further including turning on a light visible to the wristband wearer and others within a prescribed distance.

6. The process in claim 3 further including turning on a colored light and a vibration alert dependent on a worker-role of the wearer of the wristband as upon entry to the predefined zone that initiates a predefined countdown mode, prior to dispensing a sanitizing agent.

7. The process in claim 3 further including a predefined countdown mode that allows, dependent on a worker-role, a fixed time to sanitize hands, the fixed time based on a prior hand washing sequence performed by the wearer.

8. The process in claim 3 further including a hand washing sequence dependent on a worker-role of the wearer of the wristband.

9. The process in claim 3 further including, dependent on a worker-role of the wearer, alerting the wearer of the wristband by emitting a first colored light and vibration of the wristband indicating that the wearer must proceed to a washing station before further contacting food, surfaces or other individuals.

10. The process as in claim 3, including code for establishing at least two hygiene risk zones.

11. The process as in claim 3, including establishing the predefined zones defined by remote proximity sensors installed in the predefined zones.

12. The process as in claim 3, including initiating one or more queries if the wearer of a wristband is in a level 1 zone, and if the wearer is in a level 1 zone then initiating a phase II alert mode that generates a vibration pulse in the wearable wristband.

13. The process as in claim 3, including determining the passage of an interval of time, whereupon initiating a query communicated to a hand sanitation compliance module, and if compliance is negative, then the wearer of the wristband is notified as to its entry into a Phase III alert mode by vibration of the vibrator embedded in the wristband.

14. A non-transitory computer-readable medium for execution by a processor comprising code for:
maintaining hand-hygiene by controlling an operation of a wearable vibration and visual alert including: the processor, a memory, and a program for enabling one or more sensors and a wearable transceiver for establishing one of electronic or optical communication between the processor, a hand hygiene monitor and the wearable transceiver for controlling one or more of: 1) a light array, 2) a haptic transducer;
wherein one or more sensors are positioned at the hand hygiene monitor, each of the sensors configured to provide an output signal according to an individual's entry into an entered zone, of a plurality of zones, establishing a proximity to the hand hygiene monitor, the signal indicating a time the individual enters and departs the entered zone, wherein each of said zone entry or departure of the individual from the entered zone initiates a visual indicator; and optionally transmitting one or more signals when the individual departs from the entered zone to: (1) to alert the processor to reset one or more of: a) a color on the visual indicator, b) a vibrator; c) to reset a color on the hand-hygiene-monitor indicator; (2) to alert the processor to initiate an interval clock that operates for a preset time, prior to transmitting a signal to the hand-hygiene-monitor, which sets the hand-hygiene-monitor indicator to an alternative color, wherein:
the plurality of zones are each assigned to one of multiple risk zones, the multiple risk zones each associated with a risk level associated with a respective one of the plurality of zones;
the one or more conditions are dependent the risk level associated with entered zone;
an alert is activated upon an expiration of a timed interval or upon entry of the wristband into a predefined zone of the plurality of zones; and
a type of the alert is assigned based on the risk level associated with the predefined zone.

15. The non-transitory computer-readable medium for execution by a processor as in claim 14, including code for initiating queries if the wearer of a wristband is in a level I zone, and if the wearer is in a level I zone then then, initiating a phase II alert mode that allows the processor to send a vibration pulse.

16. The non-transitory computer-readable medium for execution by a processor as in claim 14, including code for determining the passage of an interval of time, whereupon initiating a query communicated to a hand sanitation compliance module, and if the compliance is negative, then the wearer of the wristband is notified as to its entry into a Phase III alert mode by the vibration of a vibrator embedded in the wristband.

17. The non-transitory computer-readable medium for execution by a processor as in claim 14, including code for initiating sending a signal to the processor to illuminate under-lighting at a specific location.

18. The non-transitory computer-readable medium for execution by a processor as in claim 14, including code for initiating a section timer and one or more of motion sensors visible on a computer programmed dashboard visible to other employed personnel.

19. The non-transitory computer-readable medium for execution by a processor as in claim 14, including code for initiating sending a signal to a dishwashing station to limit only a busser or steward as authorized personnel to enter a sanitized side of a dishwashing station.

\* \* \* \* \*